United States Patent
Benayoun et al.

(10) Patent No.: US 6,725,302 B1
(45) Date of Patent: Apr. 20, 2004

(54) UNIVERSAL SERIAL BUS (USB) WITH WIRELESS COMMUNICATION HUBS

(75) Inventors: Alain Benayoun, Cagnes sur Mer (FR); Jean-Francois Le Pennec, Nice (FR); Andre Albano, Saint Laurent du Var (FR); Patrick Michel, La Gaude (FR)

(73) Assignee: International Business Machines Corporation, Armonk, NY (US)

( * ) Notice: Subject to any disclaimer, the term of this patent is extended or adjusted under 35 U.S.C. 154(b) by 442 days.

(21) Appl. No.: 09/656,583

(22) Filed: Sep. 6, 2000

(30) Foreign Application Priority Data

Sep. 23, 1999 (EP) .............................................. 99480091

(51) Int. Cl.⁷ .............................................. G06F 13/14
(52) U.S. Cl. ................................ 710/62; 710/7; 710/8; 710/20; 710/36; 710/63; 710/64; 710/106; 710/305; 710/313
(58) Field of Search ........................... 710/7, 8, 20, 36, 710/62, 63, 64, 106, 305, 313

(56) References Cited

U.S. PATENT DOCUMENTS

| | | | | |
|---|---|---|---|---|
| 5,890,015 A | * | 3/1999 | Garney et al. | 710/62 |
| 6,516,053 B1 | * | 2/2003 | Ryan et al. | 379/21 |
| 6,519,290 B1 | * | 2/2003 | Green | 375/259 |
| 2001/0014102 A1 | * | 8/2001 | Mattingly et al. | 370/421 |
| 2003/0043771 A1 | * | 3/2003 | Mizutani et al. | 370/338 |

* cited by examiner

Primary Examiner—Jeffrey Gaffin
Assistant Examiner—Mohammad O. Farooq

(57) ABSTRACT

The invention relates to a Universal Serial Bus (USB) with two wireless communication hubs (USB hubs). One of these hubs is connected to a first host computer, and both USB hubs are connected to a plurality of I/O devices. Each USB hub includes a wireless adapter and an antenna connected to the wireless adapter. The wireless adapter of each USB hub comprises a transmitting/receiving unit for transmitting data via the antenna to the wireless adapter of the other USB hub or receiving data via the antenna from the wireless adapter of the other USB hub. The wireless adapter also comprises a wireless dual port, which is automatically configured upstream or downstream when the first host computer is connected to one of the USB hubs.

17 Claims, 6 Drawing Sheets

UNIVERSAL SERIAL BUS (USB) WITH WIRELESS COMMUNICATION HUBS

TECHNICAL FIELD

The present invention relates generally to the transmission of data between a data processing system and input/output devices, and relates in particular to a Universal Serial Bus (USB) with a wireless communication hub for transmitting data between a data processing system and input/output devices.

BACKGROUND

In 1995, several of the leading companies in the field of data processing developed an external expansion bus, which makes connecting peripherals to a personal computer (PC) as easy as hooking up a telephone to a wall-jack. The goals driving the development were ease-of-use and low cost. The development included the following specifications: PC host controller hardware and software, robust connectors and cable assemblies, peripheral friendly master-slave protocols, and expandability through multi-port hubs.

Today, the resulting Universal Serial Bus (USB) is enjoying tremendous success in the marketplace with most peripheral vendors around the globe developing products to the USB specification. Virtually all new PCs come with one or more USB ports. In fact, the USB has become a key enabler of the Easy PC Initiative led by Intel Corporation and Microsoft Corporation to make PCs easier to use. The effort was initiated based upon the recognition that users desired that connection of external components to of PCs be simplified in a manner that does not sacrifice connectivity or expandability. The USB is one of the key technologies developed to satisfy the user's needs.

The motivation for the Universal Serial Bus comes from three interrelated considerations.

(1) Connection of the PC to the Telephone

It is well understood that the merging of computing and communication will be the basis for the next generation of productivity applications. The movement of machine-oriented and human-oriented data types from one location or environment to another depends on ubiquitous and cheap connectivity. Unfortunately, the computing and communication industries have evolved independently. The Universal Serial Bus provides a ubiquitous link that can be used across a wide range of PC-to-telephone interconnects.

(2) Ease of Use

The lack of flexibility in reconfiguring PCs has been acknowledged as the Achilles heel to further deployment of PCs. The combination of user friendly graphical interfaces and the hardware and software mechanisms associated with new generation bus architectures like peripheral component interconnect (PCI), plug-and play industry standard architecture (PnP ISA), and Personal Computer Memory Card International Association (PCMCIA) has made computers less confrontational and easier to reconfigure. However, from the end user point of view, the PC input/output (I/O) interfaces such as serial/parallel ports, keyboard/mouse/joystick interfaces, etc., do not have the attributes of plug-and-play.

(3) Port Expansion

The addition of external peripherals continues to be constrained by port availability. The lack of a bi-directional, low-cost, low-to-mid speed peripheral bus has retarded the creative proliferation of peripherals such as telephone/fax/modem adapters, answering machines, scanners, personal digital assistants (PDAs), keyboards, mice, etc. Existing interconnects are optimized for one or two products. As each new function or capability is added to the PC, a new interface is defined to address the need. The Universal Serial Bus is the answer to connectivity for the PC architecture. It is a fast, bi-directional, low-cost, dynamically attachable serial interface that is consistent with the requirements of the PC platform of today and tomorrow.

When the input/output, devices are attached to the USB, the host software provides a uniform view for all the I/O subsystem. In particular, the host software manages the dynamic attach and detach of the peripherals to the USB. This phase, called enumeration, involves communicating with the peripheral to discover the identity of a device driver that it should load, if the driver is not already loaded. A unique address used for run-time data transfers is assigned to each peripheral during enumeration. During run-time, the host PC initiates transactions to specific peripherals, and each peripheral accepts its transactions and responds accordingly.

An essential part of the USB is a hub which provides managed power to attached peripherals. The hub recognizes dynamic attachment of a peripheral. A newly attached hub will be assigned a unique address, and hubs may be cascaded up to five levels deep. During run-time, a hub operates as a bi-directional repeater and will repeat USB signals as required on upstream (towards the host) and downstream (towards the device) cables. The hub also monitors the signals and handles transactions addressed to itself. All other transactions are repeated to attached devices. A hub supports both 12 Mb/s (full-speed) and 1.5 Mbs (low-speed) peripherals.

In spite of the important advantages offered by the USB, in particular the possibility for the PC to support simultaneous attachment of multiple I/O devices, the use of the USB is at present limited to devices which are located in the same room or office. Furthermore, there is only one host computer on a USB. The USB interface to the host computer is referred to the host controller, which is implemented as a combination of hardware and software. Therefore, it is not possible to connect a second computer to the USB and to make it host for controlling the system in place of the first host computer without making hardware and software changes in the system.

SUMMARY OF THE INVENTION

Accordingly, one purpose of the invention is to provide a Universal Serial Bus with wireless communication hubs enabling the input/output devices connected thereto to be located in a room or office different from the host computer location.

Another purpose of the invention is to connect input/output (I/O) devices to a first host computer via wireless communication hubs and thereafter enable a second host computer to assume control of the I/O devices.

The invention relates to a Universal Serial Bus (USB) with two wireless communication hubs (USB hubs). One of these hubs is connected to a first host computer, and both USB hubs are connected to a plurality of I/O devices. Each USB hub includes a wireless adapter and an antenna connected to the wireless adapter. The wireless adapter of each USB hub comprises a transmitting/receiving unit for transmitting data via the antenna to the wireless adapter of the other USB hub or receiving data via the antenna from the wireless adapter of the other USB hub. The wireless adapter also comprises a wireless dual port, which is automatically configured upstream or downstream when the first host computer is connected to one of the USB hubs.

The above as well as additional purposes, features, and advantages of an illustrative embodiment will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
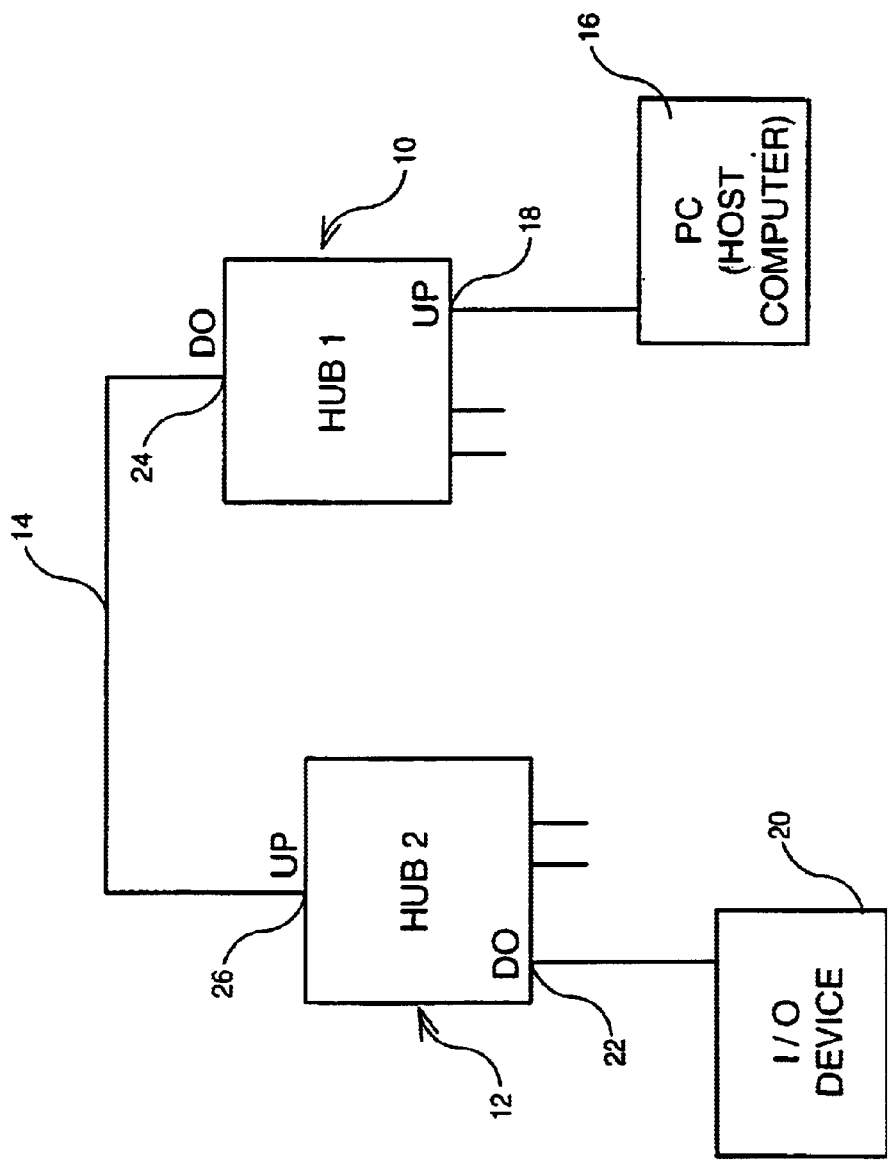
FIG. 1 is a block diagram of a configuration of the Universal Serial Bus with two hubs according to the prior art.

Referring now to the figures and in particular to FIG. 1, a simple standard configuration of the Universal Serial Bus (USB) useful to implement the invention is illustrated. The configuration of FIG. 1 comprises two hubs 10 and 12 connected by a line 14. Each hub is provided with one upstream port to which is connected a master device, generally a host computer, and several downstream ports to which are connected the I/O devices. Thus, PC 16 acting as host computer is connected to upstream port 18 of hub 10, while I/O device 20 is connected to downstream port 22 of hub 12. In the configuration illustrated in FIG. 1, line 14 is connected between downstream port 24 of hub 10 and upstream port 26 of hub 12.

The USB physical interconnect is a star topology from the USB host computer to the USB I/O devices. A hub is at the center of each star, and each wire segment is a point-to-point connection between the host computer and a hub or a connection between a hub and another hub.

Signaling and power in a USB are transferred over a four wire cable. The signaling occurs over two wires and point-to-point segments. There are two modes of signaling, full speed signaling at a bit rate of 12 Mbits/s and limited capability low speed signaling at 1.5 Mbits/s. Both modes can be simultaneously supported in the same USB by mode switching between transfers in a device-transparent manner. The low speed mode is defined to support a limited number of low bandwidth devices such as mice, since more general use would degrade bus utilization.

The USB supports attachment and detachment of USB devices to and from the USB at any point in time. All USB devices are accessed by a unique USB address. Bus enumeration identifies and addresses the devices attached to the USB at startup time, and the information collected is static. Since the devices may be attached to or detached from the USB at any time, bus enumeration is an on-going activity. Additionally, bus enumeration also includes the detection and processing of device removals. In addition to managing control and data flow transmitted to or from the USB devices, the host computer is in charge of detecting the attachment and removal of the I/O devices from the USB.

Figure 2:
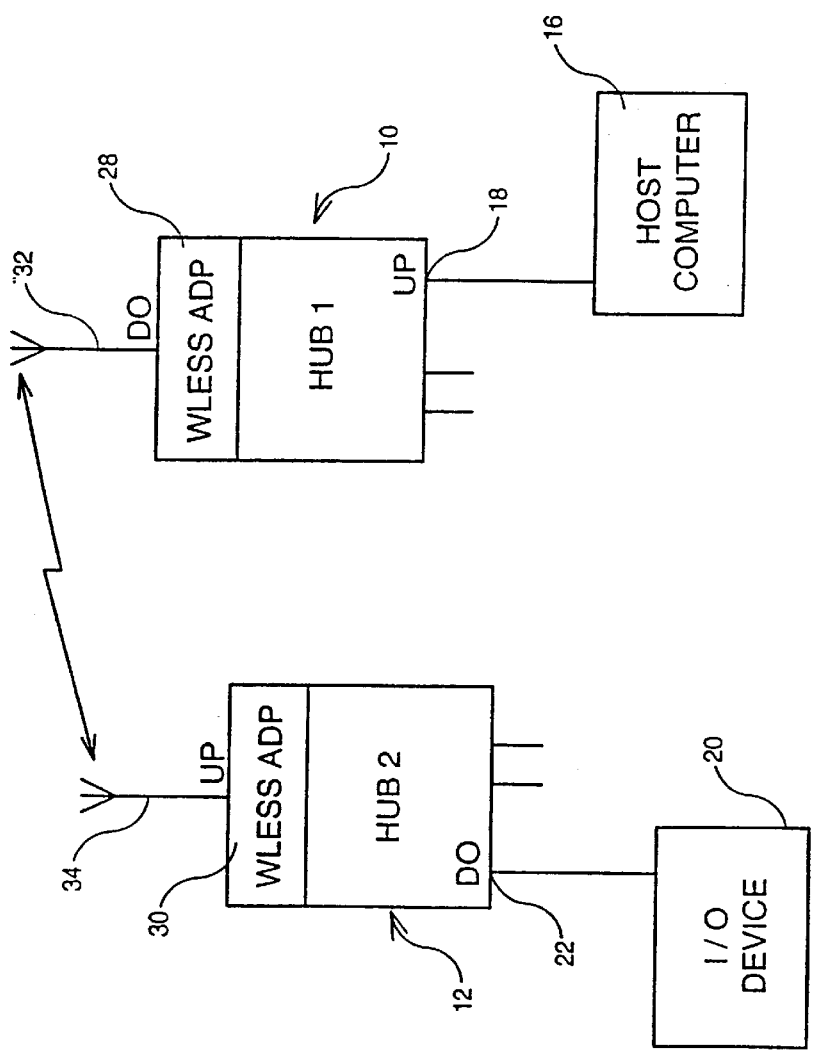
FIG. 2 is a block diagram of a configuration of the Universal Serial Bus with two hubs connected by a wireless link according to one embodiment of the invention.

FIG. 2 illustrates a modified USB configuration according to one embodiment of the invention. As illustrated, a wireless adapter is integrated in each hub. Wireless adapter 28 added to hub 10 is used as a downstream port (the only upstream port of the hub is occupied by the host computer connection), while wireless adapter 30 added to hub 12 is used as an upstream port. Wireless adapter 28 is provided with an antenna 32 by which communication with wireless adapter 30, also provided with an antenna 34, is completed. Communication is completed by means of radio waves at, for example, a frequency of 2.4 GHz.

As previously mentioned, a configuration in which cable 14 is replaced by a wireless connection enables the two hubs of the USB to be located in different rooms or offices, and each one can be moved without encountering the problem of having to change the cable connecting the two hubs.

Figure 3:
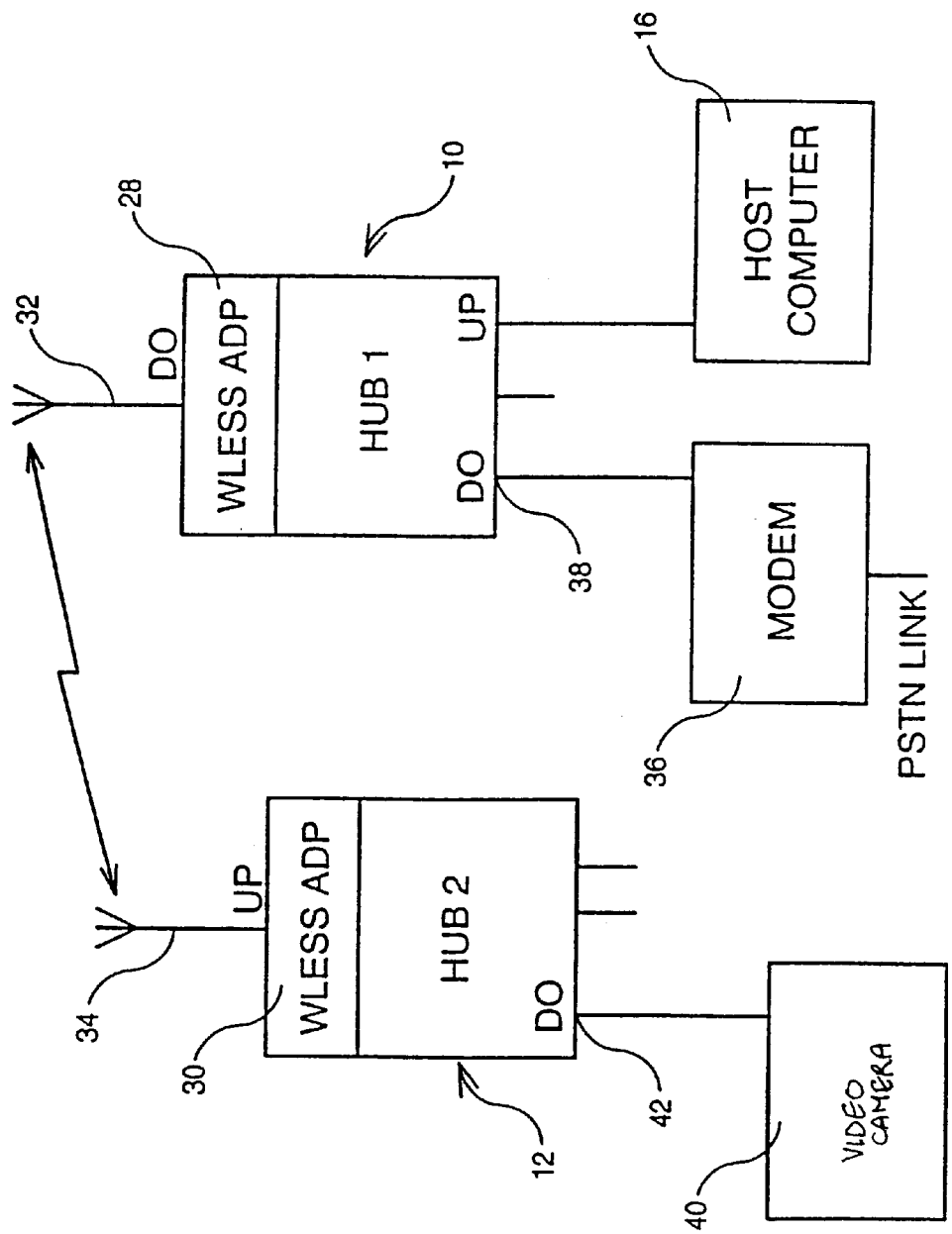
FIG. 3 is a block diagram of the configuration of FIG. 2 in which a video camera and a modem have been connected as I/O devices.

FIG. 3 shows a typical use of the configuration illustrated in FIG. 2. In this configuration, host computer 16 can communicate with the PSTN network via modem 36 connected to downstream port 38 of hub 10. A second peripheral device, such as video camera 40 connected to downstream port 42 of hub 12, is used in another room, and the video signals are transmitted to host computer 16 via a wireless link between the two hubs.

Figure 4:
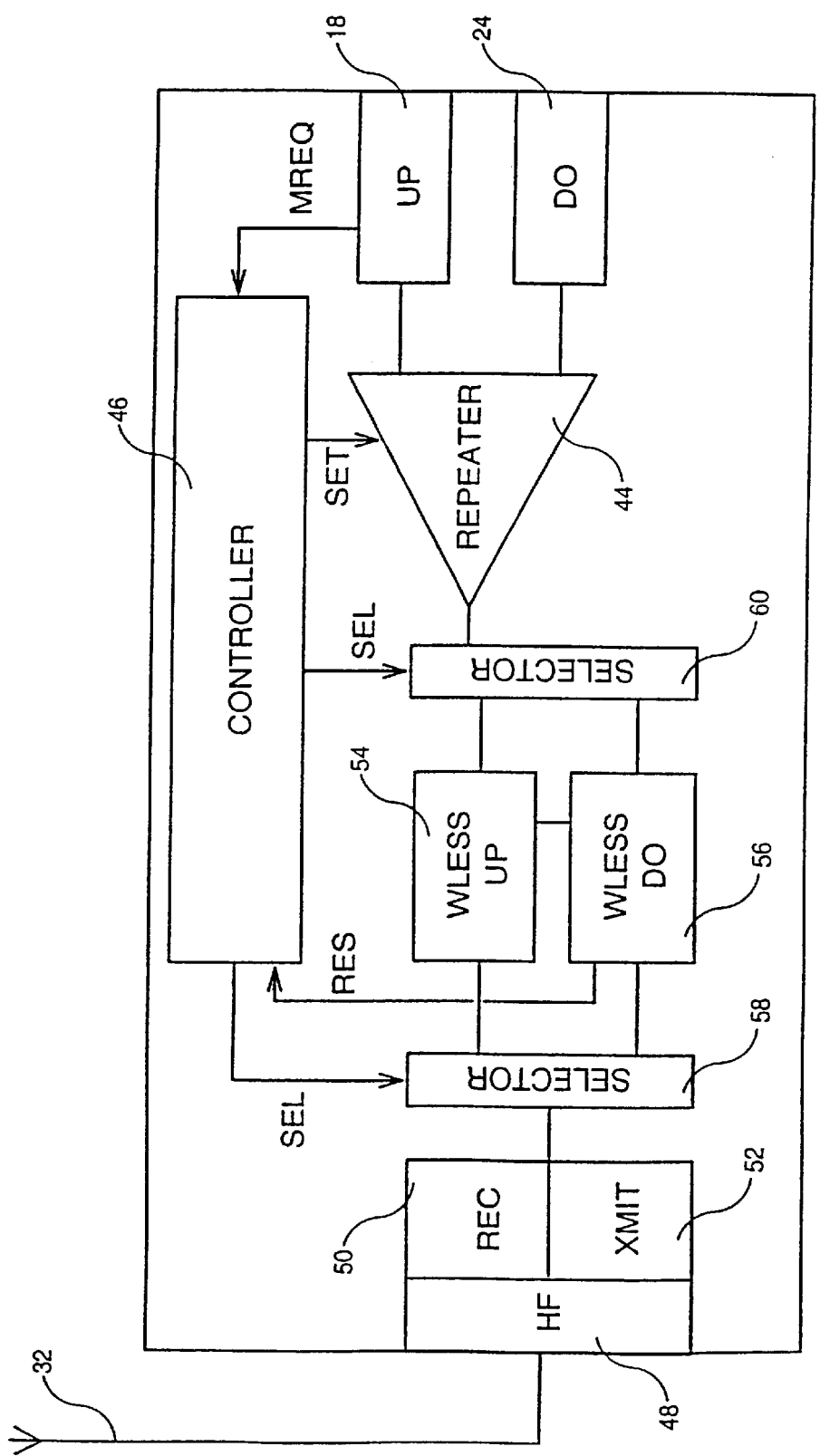
FIG. 4 is a block diagram of a hub controller used with a USB according to the one embodiment of the invention.

A hub implemented according to the invention is illustrated in FIG. 4. A traditional hub consists principally of two components, repeater 44 and hub controller 46. Repeater 44 is responsible for connectivity setup and tear-down and also supports exception handling such as bus fault detection and recovery and connect/disconnect detection. In fact, repeater 44 is a protocol-controlled switch, ensuring bi-directional connectivity between the upstream port, such as UP port 18, and downstream port, such as DO port 24. Repeater 44 also has hardware support for reset and suspend/resume signaling. As utilized herein, "bi-directional connectivity" means that data are transferred through the repeater from an upstream port to all downstream ports and from a downstream port to the upstream port.

In accordance with the invention, wireless adapter 28 comprises a bi-directional transmission unit composed of a high frequency block connected to antenna 32, which receives radio signals and communicates them to a receiving (REC) block 50 for converting them into digital data. Antenna 32 also transmits radio signals, which have been converted from digital data by transmission (XMIT) block 52. Wireless adapter 28 also includes a wireless dual port including a wireless upstream port 54 and a wireless downstream port 56. One of the wireless dual ports is selected by selector 58 to be connected to REC block 50 or XMIT block 52 according to whether the wireless adapter of the hub is used as an upstream port or a downstream port. Another selector 60 selects in the same manner one of the two wireless ports to be connected to repeater 44. The two selectors 58 and 60 are both activated by a SEL signal from hub controller 46.

When a host computer is connected to the physical upstream port 18, as illustrated in FIG. 2, a MREQ signal is transmitted to hub controller 46. Hub controller 46 selects wireless DO port 56 by sending a SEL signal to selectors 58 and 60. At the same time, a message is exchanged between the local hub controller and the remote hub controller. Then, the remote controller selects the wireless UP port by sending a SEL signal, and a signal SET is transmitted to the repeater for switching to all the physical downstream ports.

Figure 5:
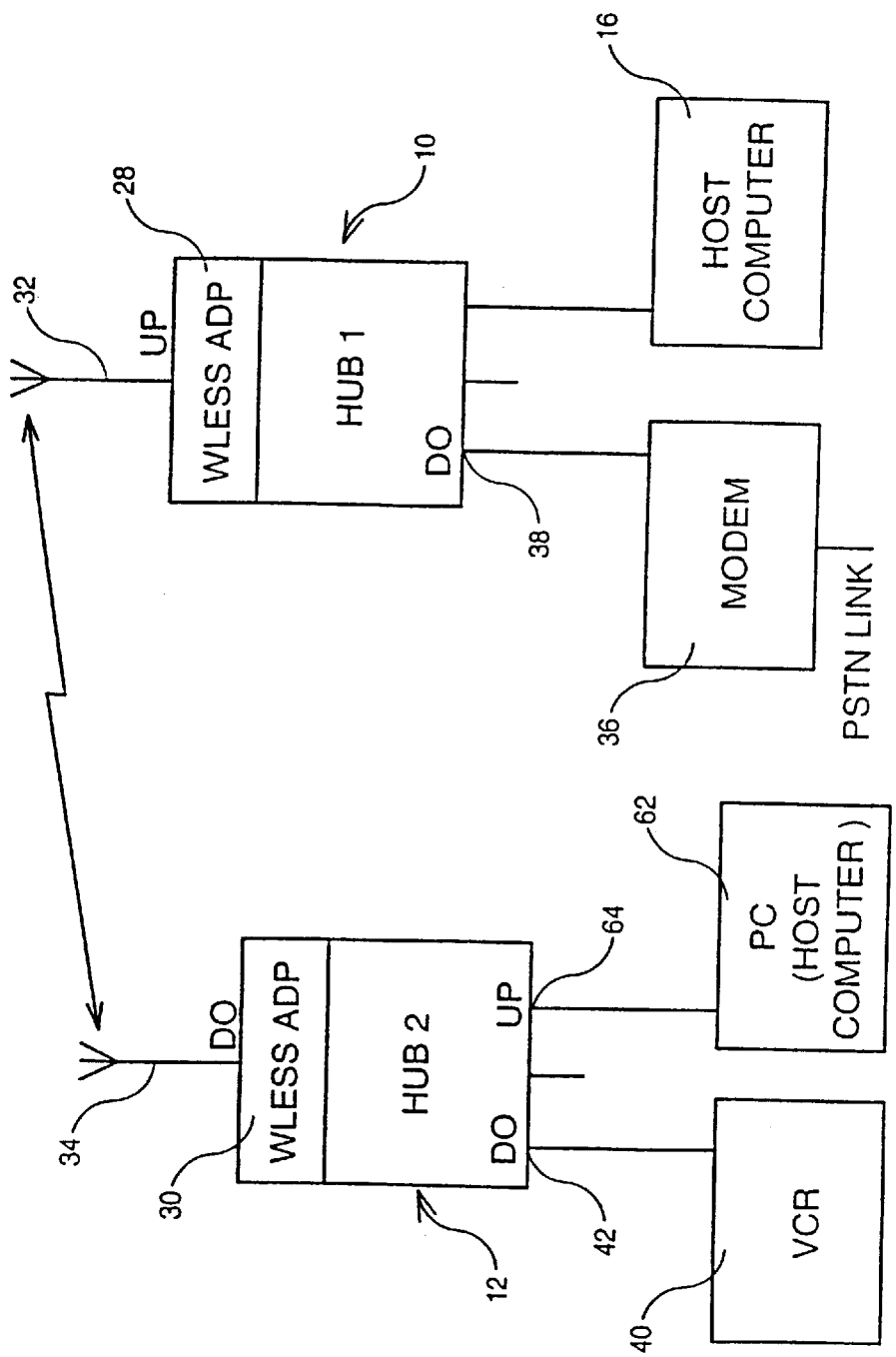
FIG. 5 is a block diagram of the configuration of FIG. 3 in which a second PC has been connected as a new host computer of the Universal Serial Bus.

According to the invention, an important feature of the system is to enable another host computer to be connected in place of the first host computer without hardware changes. Thus, FIG. 5 illustrates the configuration of FIG. 3 in which a PC to be used as new host computer 62 has been connected to physical upstream port 64. In this embodiment, the previous host computer (PC) 16 is disabled during the period of time new host computer 62 is the master device. In another embodiment, an interleaved transmission is implemented in which new host computer 62 is sometimes the host computer and at other times, PC 16 is the host computer. Thus, a new PC (for example, a portable computer such as a notepad computer) can take the control of the USB for its own operations. In the illustrative configuration of FIG. 5, new host computer 62 gets control of the locally attached video camera 40 and also of remote modem 36 to transmit data over the PSTN link. In the meantime, the UP port of hub 10 is disabled, and PC 16 is logically disconnected from the hub.

Returning to FIG. 4, when the new host computer is connected to the upstream port 64 of remote hub 12, a signal MREQ is sent to the controller. The controller selects the wireless downstream port by a SEL signal, as explained above, and sets the repeater. A message is sent to local hub 10 in order to inform it that a new host computer has been connected. According to the invention, the user of PC 16 connected to local hub 10 at this stage may enter into negotiation with the new host computer 62 for defining the UP port 64 of hub 12 as a pseudo-downstream port. If there is no such capability, the wireless downstream port of the local hub 10 sends a reset (RES) signal to its controller. As for the remote hub, controller 46 activates signals SEL to select the wireless upstream port 54,g and sends a signal SET to repeater 44 for repeater 44 to be linked to all downstream ports. Therefore, UP port 18 is disabled resulting in the disconnection of PC 16, which is no longer the host computer.

The implementation of a wireless adapter in the hub enables the hub repeater to see one wireless port (upstream or downstream) according to whether its physical UP port is activated or not. Accordingly, there is no possible risk of contention. Such a risk would exist if two physical UP ports were simultaneously present in a hub.

Figure 6:
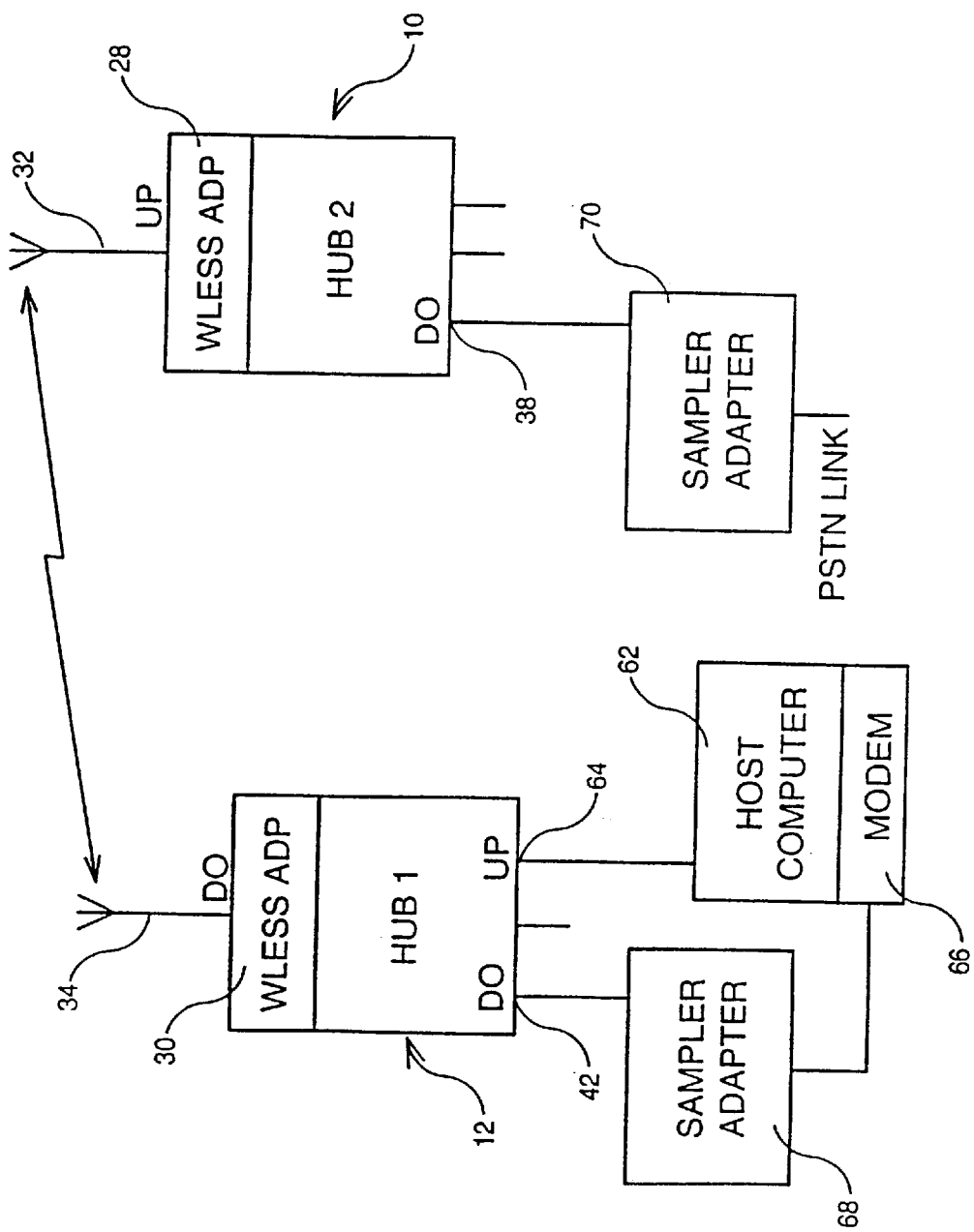
FIG. 6 is a block diagram of a specific configuration similar to FIG. 5 in which the host computer transmits through a modem incorporated therein according to one embodiment of the invention.

FIG. 6 illustrates a configuration similar to the configuration of FIG. 5 in which host computer 62 has its own integrated or attached modem 66. In this case, the output of the modem is analog and thus transmitted on two wires. In order to transport the output over the USB which is digital and full duplex, a conversion must be performed. The conversion is performed in a sampler adapter 68 connected to downstream port 42 of hub 12. A sampling is performed at a frequency that allows the transparency of the transport through the USB and also through the wireless bridge. For two-wire analog transmission, in the preferred embodiment, an over sampling at 128 kbps is performed after a two-wire to four-wire conversion in order to separate transmit and receive channels. The reverse function is performed on the receiving side utilizing a sampler adapter 70 connected to downstream port 38 and to PSTN link.

Note that a similar scheme may be used when the modem is digital (e.g., offering a basic rate interface Integrated Services Digital Network (BRI ISDN) interface). For a digital modem, the sampling is performed at least at 384 kbps on a four-Wire S/T0 interface and a two-wire to four-wire conversion is not required. Similarly, it is possible to interface S/T1 to S/T2 interfaces and also U0 two-wire interface. The same sampler adapter may be used to convert analog video signals by choosing the appropriate sampling frequency. Utilization of the sampler adapter allows a non-USB analog device to take advantage of the remote USB and the wireless system.

While an illustrative embodiment has been particularly shown and described, it will be understood by those skilled in the art that various changes in form and detail may be made therein without departing from the spirit and scope of the illustrative embodiment.

What is claimed is:

1. A system for remotely connecting a host computer to external input/output (I/O) components, said system comprising:
   first and second serial bus hubs that each include a respective wireless communication port, wherein each of said first and second serial bus hubs includes at least one respective physical downstream port to which a respective one of a plurality of I/O devices is connected, wherein an I/O device connected to said downstream port of said second serial bus hub communicates with a host computer coupled to said first serial bus hub utilizing wireless communication between said first and second serial bus hubs, and
   means for logically disconnecting said first host computer from the physical upstream port of said second serial bus hub when a second host computer is connected to said first serial bus hub, wherein said logically disconnecting step is dynamically implemented.

2. The system of claim 1, wherein each of said first and second serial bus hubs includes a wireless adapter and an antenna connected to said wireless adapter.

3. The system of claim 2, wherein each of said first and second serial bus hubs further includes:
   a radio transmitting/receiving unit within said wireless adapter;
   a wireless dual port including a wireless upstream port and a wireless downstream port; and
   a controller, which automatically selects said wireless downstream port when said host computer is connected to said physical upstream port.

4. The system of claim 3, wherein each of said first and second serial bus hubs further includes a physical upstream port for connecting said host computer and which sends a signal to said controller when said host computer is connected to said physical upstream port.

5. The system of claim 4, wherein each of said first and second serial bus hubs further comprises a repeater that selectively connects one of said physical upstream port and said wireless upstream port to one or more downstream ports including said wireless downstream port.

6. The system of claim 5, wherein said host computer is a first host computer associated with said first serial bus hub, wherein when a second host computer is associated with said second serial bus hub, said system including means for sending a message from said first serial bus hub to the second serial bus hub when said second host computer is connected to the physical upstream port of said first serial bus hub to inform said second serial bus hub to configure the wireless dual port of the wireless adapter of said second serial bus hub upstream instead of downstream and disable the physical upstream port of said second serial bus hub.

7. The system of claim 1, wherein said host computer is connected to an upstream port of said first serial bus hub and includes a modem connected to a downstream port of said first serial bus hub via a first sampler adapter, said system further comprising means for connecting a downstream port of the second serial bus hub to a public switched telephone network (PSTN) link via a second sampler adapter so that said host computer may transmit data directly over the PSTN net work.

8. A serial bus hub for wireless transmission comprising:
a plurality of physical downstream input/output (I/O) ports for connecting to a plurality of I/O devices;
at least one physical upstream port for connecting to a host computer;
a wireless adapter and an antenna connected to said wireless adapter, wherein said wireless adapter transmits and receives data via a wireless communication medium and enables communication transmission between said serial bus hud and a second serial bus hub;
a wireless dual port, including a wireless upstream port and a wireless downstream port and wherein said wireless dual port includes a controller that automatically configures said wireless dual port upstream or downstream when said host computer is connected to said serial bus hub; and
wherein said host computer is a first host computer associated with said serial bus hub, wherein when a second host computer is associated with the second serial bus hub, said serial bus hub including means for sending a message to the second serial bus hub when said second host computer is connected to the physical upstream port of said serial bus hub to inform said second serial bus hub to configure the wireless dual port of the wireless adapter of said second serial bus hub upstream instead of downstream and disable the physical upstream port of said second serial bus hub.

9. The serial bus hub of claim 8, wherein said physical upstream port sends a signal to said controller when said host computer is connected to said physical upstream port.

10. The serial bus hub of claim 9, further comprising a repeater, that selectively connects one of said at least one physical upstream port and said wireless upstream port to one or more downstream ports including said wireless downstream port.

11. A method for remotely connecting a first host computer to external devices on a serial bus, said method comprising the steps of:
connecting said first host computer to a first serial bus hub via a physical upstream port; and
connecting said external devices via physical downstream I/O ports of a second serial bus hub;
communicating data between said first host computer and said external devices via a wireless link established between said first serial bus hub and said second serial bus hub; and
transmitting a message from said first serial bus hub to the second serial bus hub when a second host computer is connected to the physical upstream port of said first serial bus hub to signal said second serial bus hub to configure the wireless dual port of the wireless adapter of the second serial bus hub upstream instead of downstream and to disable the physical upstream port of said second serial bus hub.

12. The method of claim 11, further comprising the step of sending a signal to said controller when said first host computer is connected to said physical upstream port.

13. The method of claim 12, further comprising the step of:
selectively connecting one of said physical upstream port and said wireless upstream port to one or more downstream ports including said wireless downstream port.

14. The method of claim 11, wherein said first host computer is logically disconnected from the physical upstream port of said second serial hub when said second host computer is connected to said first serial bus hub.

15. A method for remotely connecting external devices to a host computer, said method comprising the steps of:
coupling said external devices to a first serial bus hub via physical downstream I/O ports;
connecting said host computer to a second serial bus hub via a physical upstream port, wherein said second serial bus hub communicates with said first serial bus hub via a wireless link;
in response to said connecting step, automatically configuring said second serial bus hub to permit said host computer to control said external devices via said wireless link; and
wherein said host computer is connected to an upstream port of said first serial bus hub and includes a modem connected to a downstream port of said first serial bus hub via a first sampler adapter, said system further comprising means for connecting a downstream port of the second serial bus hub to a public switched telephone network (PSTN) link via a second sampler adapter so that said host computer may transmit data directly over the PSTN network.

16. The method of claim 15, wherein said host computer is a first host computer and wherein a second host computer is attached to said first serial bus hub prior to said connecting step, wherein in response to said connecting step, said method further comprises the step of automatically configuring said first serial bus hub to transfer control of said external devices to said first host computer via said wireless link.

17. The method of claim 15, further comprising the steps of communicating data between said first serial bus hub and said second serial bus hub.

* * * * *